C. O. MICHAELSEN.
ROTARY CLASSIFIER.
APPLICATION FILED AUG. 26, 1913.
1,140,700.
Patented May 25, 1915.
3 SHEETS—SHEET 1.
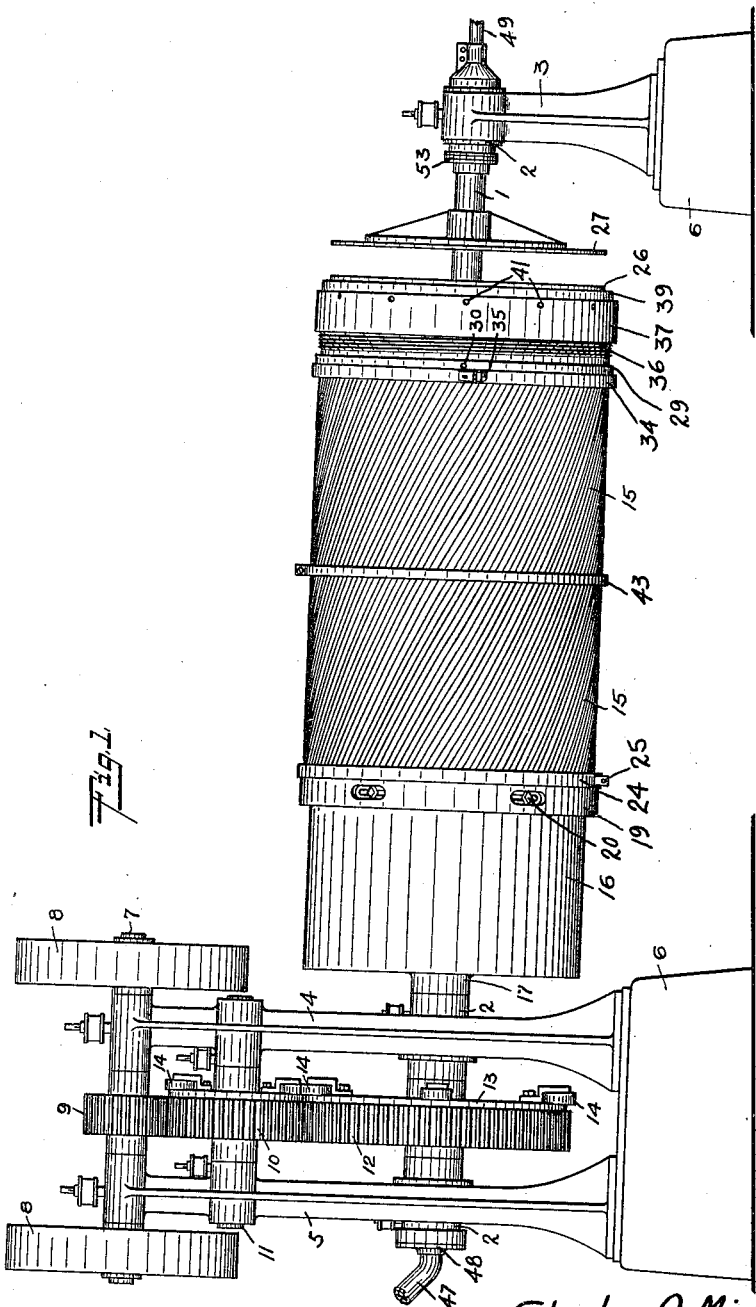

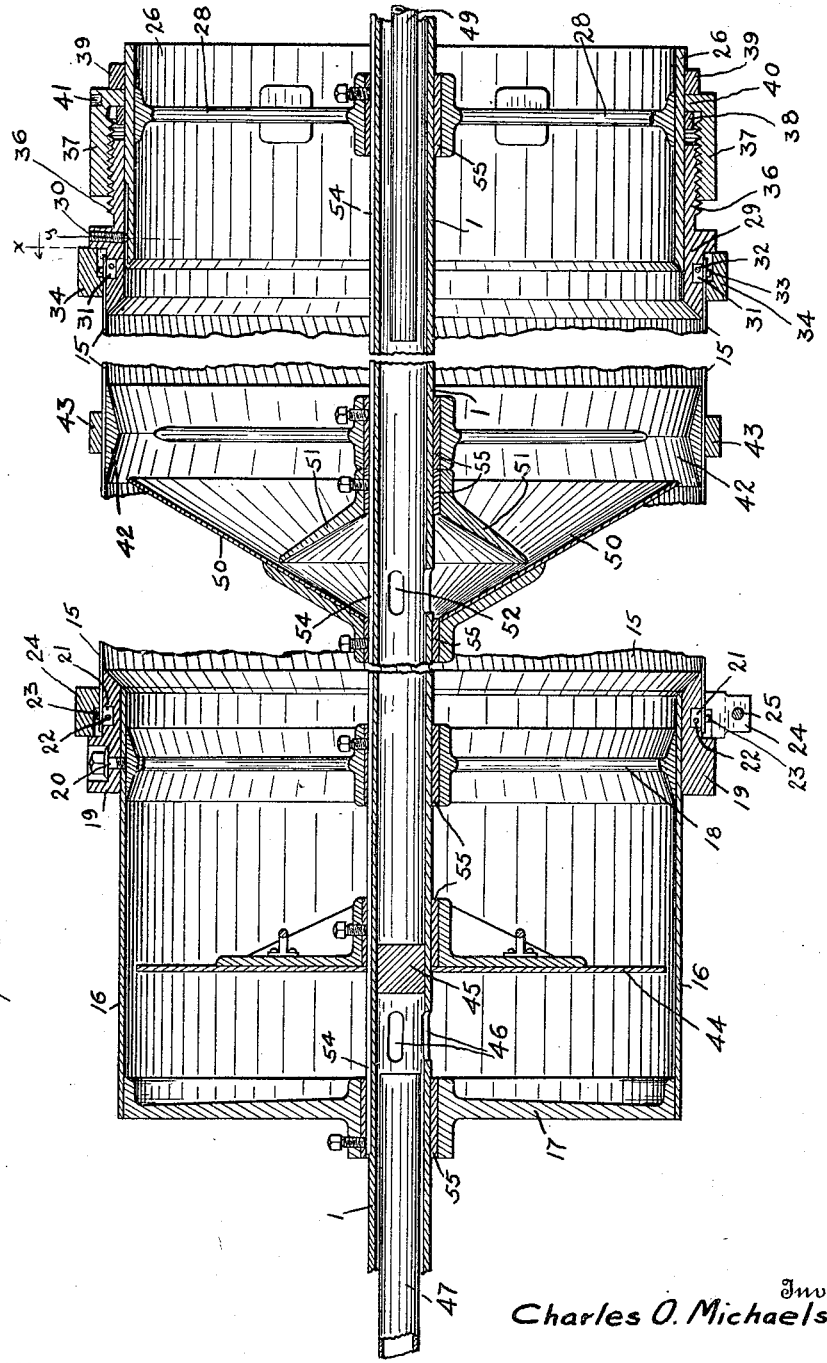

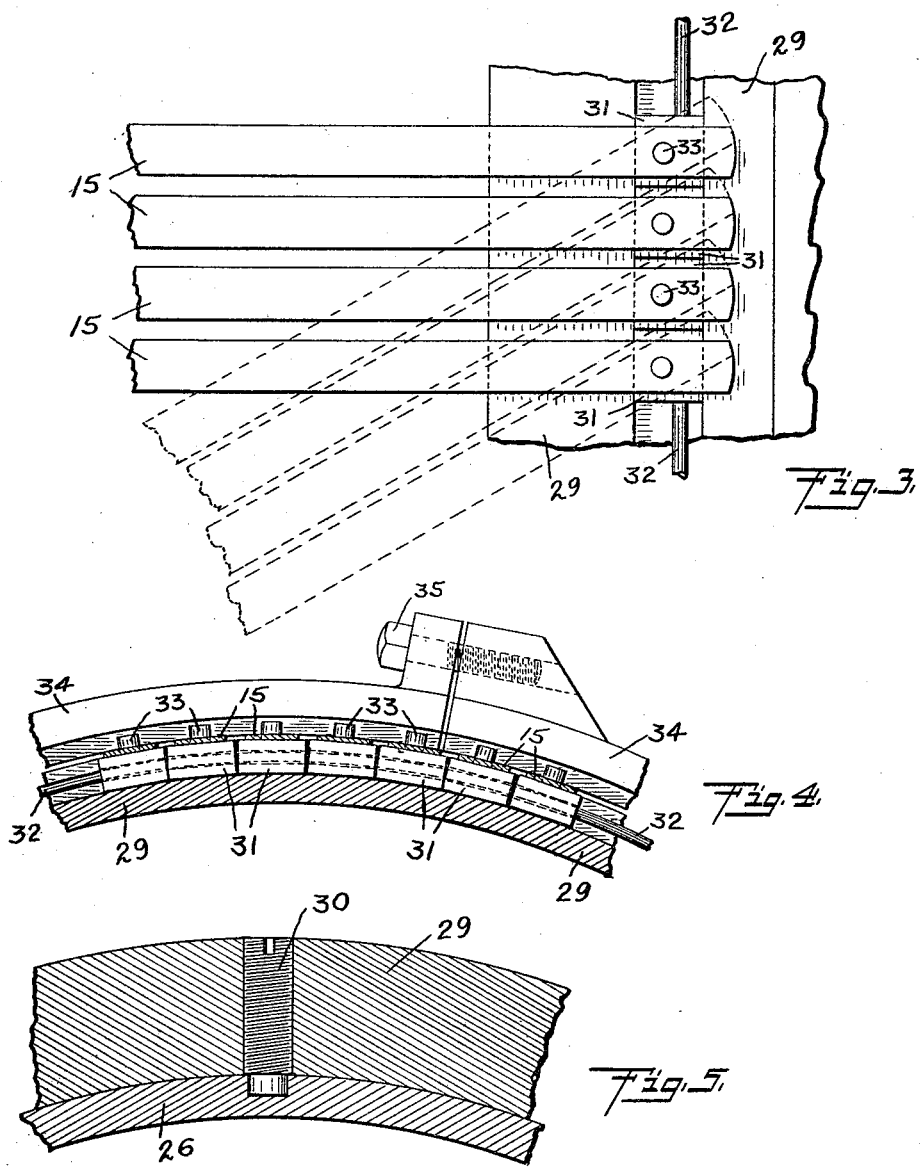

UNITED STATES PATENT OFFICE.

CHARLES O. MICHAELSEN, OF OMAHA, NEBRASKA.

ROTARY CLASSIFIER.

1,140,700.　　　　　Specification of Letters Patent.　　Patented May 25, 1915.

Application filed August 26, 1913. Serial No. 786,806.

*To all whom it may concern:*

Be it known that I, CHARLES O. MICHAELSEN, a citizen of the United States, and a resident of Omaha, in the county of Douglas and State of Nebraska, have invented certain new and useful Improvements in Rotary Classifiers, of which the following is a specification.

My invention relates to screening or classifying mechanism and especially to mechanism of this class especially adapted for separating, classifying or grading crushed, pulverized or granular ores.

It is the object of my invention to provide a machine of this class which will have a wide range of utility, the screen devices being so constructed that the size of the openings through the same may be varied without interchanging of parts, and quickly adjusted so as to pass only particles of material of less than a desired maximum size.

A further object of my invention is to provide a cylindrical rotary screen having helical openings therein of uniform width, and wherein the direction, inclination and width of the helical openings may be varied at will.

In the accompanying drawings, Figure 1 is a side view of a machine embodying my invention, Fig. 2 is a detail longitudinal sectional view of the same with parts broken away, Fig. 3 is a detail of the end-portions and pivotal attaching means for the screen-bars, Fig. 4 is a detail transverse section on the plane of the line $x$ of Fig. 2, and Fig. 5 is a detail transverse section on the plane of the line $y$ of Fig. 2.

In the illustrated embodiment of my invention I provide a tubular shaft 1 which is disposed in a position slightly inclined from a horizontal plane and is journaled in bearings 2 carried by standards 3, 4 and 5. The said standards are supported upon a suitable foundation, such as blocks 6 of concrete or the like. In the upper parts of the standards 4 and 5 are bearings in which is journaled the driving-shaft 7, said shaft carrying at its ends the fly-wheels 8 which may also be used as pulleys and connected by belt with a suitable source of power. On the central part of the driving-shaft 7 is secured a pinion 9. Said pinion meshes with a gear 10 carried on a shaft 11 which is journaled in bearings arranged in the standards beneath the bearings for the shaft 7. The gear 10 meshes with a gear 12 which is mounted concentrically with the shaft 1. The gear 12 is preferably connected yieldingly with a hub-body 13 which is secured to the shaft 1, said hub-body and the gear 10 carrying rollers 14 which interfere during the rotation of the gears and periodically retard the rotative movement of the hub-body and shaft 1, so that a uniform continuous rotation of the driving shaft 7 produces an intermittent or alternately retarded and accelerated rotation of the shaft 1. The detailed construction of the said interrupted-drive gearing is shown in Letters Patent No. 1,040,251, issued to me October 1, 1912, and is specifically claimed in the application filed August 3, 1911, Serial No. 642,216, allowed July 9, 1913.

On the shaft 1 between the standards 3 and 4 is supported a cylindrical screen comprising essentially a series of flexible flat bars 15 arranged to form a cylinder, and of which the adjacent ends are pivotally connected to parts for holding them at like distances from each other, the means for holding the bars at one end being adjustable circumferentially of the cylinder with reference to the means for holding the bars at the other end, so that the inclination of the bars to the axis of the cylinder may be varied, with a resultant variation of the widths of the openings between the adjacent edges of the bars.

In the structure shown the upper or receiving end of the screen-cylinder, the end nearest the standard 4, is formed by a cylindrical shell 16 which is supported in concentric relation to the shaft 1 by means of a circular flanged end-plate 17 and a spider-ring 18, the end-plate 17 serving to close one end of the shell, and the other end of the shell, adjoining the screen-bars 15, being open. Upon the open end of the shell is disposed the ring 19, the same being secured to the shell by screws 20 which pass through circumferential slots in the ring, so that when said screws are loosened the ring may be adjusted circumferentially of the shell. Near one side of the ring an annular channel is formed therein in which is disposed the pivot-blocks 21. Said blocks are connected to each other by means of a circular rod or hoop 22 which extends through openings in the blocks circumferentially of the channel. On the outer side of each of the pivot-blocks is a small pin 23 which extends through an opening in one of the screen bars so that the bar is thereby pivotally connected to the block. The screen-bars are retained upon the pins 23 by means of the split clamp-ring 24 which is disposed around the end-portions of the bars, as shown in Fig. 2, the ends of the clamp-ring being connected to each other by one or more screws 25 so that the ring-parts may be drawn together to clamp the screen-bars against the adjoining portion of the ring 19. A portion of the clamp-ring covers the pivot-blocks and normally fits against a shoulder on the ring 19, as shown.

The lower or discharge end of the screen-cylinder, adjacent to the standard 3, is formed by a cylindrical shell 26 which is supported in concentric relation to the shaft 1 by means of a spider 28. Upon said shell is slidably mounted the ring 29, a screw 30 passing through the ring and extending into a longitudinal slot in the shell to prevent rotation of the ring relatively to the shell. In the ring 29 there is an annular channel in which are disposed the pivot-blocks 31. The pivot-blocks are connected to each other by a hoop 32, each of the blocks has a pin 33 which passes through the end-portion of one of the screen-bars, and the screen-bars are held upon the pins and against the ring 29 by a split clamp-ring 34 of which the parts may be drawn together by a screw 35, the structure and arrangement of the parts mentioned being identical with that of the corresponding parts at the other end of the screen-bars.

At one side of the ring 29 and integral therewith is a threaded sleeve 36 which is engaged by an internally-threaded ring 37, as shown. The threaded ring is rotatable upon the shell 26 and is held in fixed longitudinal relation to the shell by means of rings 38 and 39 secured to the shell, an internal annular lip 40 on the threaded ring extending in between said rings 38 and 39. The ring 37 has in its peripheral portion a plurality of radial openings 41 into which the lugs of a suitable spanner-wrench may be inserted and the ring rotated thereby. Obviously, rotation of the ring 37 will move the ring 29 longitudinally of the shell and tighten or loosen the screen-bars.

The central parts of the screen-bars engage the peripheral surface of a spider-ring 42 which is disposed upon the shaft 1, the bars being held against the ring by a split clamp-ring 43, as shown.

Within the shell 16, between the end-plate 17 and spider-ring 18, a circular baffle-plate 44 is mounted on the shaft 1, the diameter of the plate being such that a narrow annular opening is left between the shell and the peripheral edge of the plate. In the bore of the shaft at a position coincident with the baffle-plate is a plug 45, and in the sides of the shaft between the baffle-plate and the end-plate 17 are ports 46. The pulverized ore or other material to be operated upon, together with a certain amount of water, are fed into the upper end of the tubular shaft through a pipe 47, said pipe extending through a packing 48 at the end of the shaft and terminating near the ports 46. The material is discharged from the ports 46 into the cylindrical chamber inclosed by the shell 16, end-plate 17 and baffle-plate 44, and escapes from said chamber through the annular opening between the shell and the edges of the baffle-plate, being thereby distributed around the shell in a thin sheet or stream. On account of the inclination of the cylinder and its rotary movement, the material flows around the inner surface of the cylinder in a helical path and is thus carried across the screening surface formed by the bars 15.

As a part of the water fed into the machine with the material will quickly escape through the screen, means are provided for supplying an additional quantity of water thereto after it has passed over a part of the screen. For this purpose, a pipe 49 is extended into the lower end of the shaft 1 through a suitable packing, the said pipe being connected with a water supply. On the shaft between the spider-rings 18 and 42 are disposed a pair of hollow cones 50 and 51, the first being the larger and its outer edges extending near the rim of the spider-ring 42, the smaller cone 51 facing oppositely to the larger and being disposed so that a narrow opening is left between the outer edge thereof and the inner surface of the larger cone 50. The water supplied through the pipe 49 escapes from the tubular shaft through ports 52 formed in the sides thereof between the cones 50 and 51, and passes outwardly along the inner surface of the cone 50, being thereby uniformly distributed onto the materials passing over the screen.

In order to facilitate the passage of the material along the cylinder, the rims of the spider-rings 18 and 42, and the inner ends of the shells 16 and 26 and of the rings 19 and 29, are beveled as shown in Fig. 2. Near the lower or discharge end of the shell 26 a circular plate 27 is disposed upon the shaft 1, said plate being adjustable longitudinally of the shaft so that it may be employed to restrict the discharge opening at the end of the shell. For receiving the end-thrust of the shaft due to its inclined position, a suitable thrust-bearing 53 is provided adjoining the end of the bearing 2 carried by the standard 3.

Referring now particularly to Fig. 3, it will be apparent that the slots between the adjacent edges of the screen-bars 15 will be widest when the bars are disposed parallel with the axis of the screen-cylinder as shown by the full lines in said figure; that the width of the slots will be reduced as the bars are inclined to the cylinder-axis as shown by the dotted lines in said figure; and that the edges of the bars will finally come into contact with each other when the inclination thereof is sufficiently great. The screen-bars, except when disposed parallel with the cylinder-axis, extend helically about the cylinder, like a screw-thread of large pitch, the pitch of the helices being least when the inclination of the bars to the cylinder axis is greatest, and the pitch increasing to infinity as the bars are moved to the position parallel with the cylinder-axis.

In the adjustment of the screen-bars to different inclinations, the clamp-rings 24, 34 and 43 are first loosened, then the screws 20 are removed from the ring 19, then said ring is rotated upon the shell 16 until the screen-bars are at the desired inclination, then the ring 29 is moved longitudinally by rotating the threaded ring 37, the peripheral slots in the ring 19 being brought into coincidence longitudinally with the openings in the shell 16 for the screws 20, said screws 20 then being replaced to hold the ring in fixed relation to the shell 16, the screen bars then placed under a suitable tension by further longitudinal movement of the ring 29, and finally the clamp-rings 24, 34 and 43 tightened up to retain the parts fixedly in the adjusted position. When only a slight change is made in the inclination of the screen-bars, the screws 20 need not be entirely removed from the ring 19, but may be merely loosened enough to permit the ring to be turned. When a considerable change is made in the inclination of the screen-bars the longitudinal adjustment of the ring 29 made by rotating the threaded ring 37 may not be sufficient to compensate for the variation in the longitudinal extension of the screen-bars. In this event the position of the shell 26 may be changed by moving the spider 28 longitudinally upon the shaft. It may be here noted that, for convenience in securing the various members upon the shaft 1, a spline 54 is provided in one side of the shaft, the spline extending through the hub-portions of the end-plate 17, baffle-plate 44, spider-ring 18, cones 50 and 51, spider-ring 42, spider 28 and the plate 27, so as to prevent rotation of any of said parts relatively to the shaft. Each of said parts is also provided with suitable set-screws, as shown in Fig. 2, and each is preferably provided in the bore of the hub with a bushing 55 of material different from the shaft so as not to be liable to adhere to the shaft by corrosion.

As the screen-bars may be inclined in either direction from the position parallel with the cylinder-axis, the direction of the helices formed by the bars may be either to the right or to the left, that is, so as to extend similarly to a right-hand or a left-hand screw-thread. As before noted, the materials fed into the machine pass around the cylinder in a more or less helical path, due to the rotary movement of the cylinder and its downward inclination from the receiving to the discharging end thereof. As the direction of rotation of the cylinder is always the same, it will be apparent that when the screen-bars are inclined in one direction they will tend to coincide with the path of the material passing along the cylinder, and that when inclined in the other direction the bars will tend to assume a position transverse to the path of the material. It will also be apparent that when inclined in one direction the action of the bars upon the material will tend to accelerate its movement along the cylinder, while when inclined in the other direction the bars will tend to retard the movement of the material along the cylinder. These variations in the action of the mechanism may often be employed advantageously in the manipulation of different materials, and greatly extend the range of utility of the machine.

Now, having described my invention, what I claim and desire to secure by Letters Patent is:

1. In a machine of the class described, a revolubly mounted shaft, cylindrical shells mounted concentrically thereon and spaced apart longitudinally, rings mounted on the respective shells, means for varying the position of one of the rings longitudinally and means for varying the position of the other ring circumferentially of the respective shells, and a plurality of flexible bars connected with the rings and extending between them in uniformly-spaced relation to each other.

2. In a machine of the class described, a revolubly mounted shaft, two longitudinally-spaced cylindrical shells fixedly mounted on said shaft concentrically therewith, a ring on one of said shells secured to variable circumferential relation thereto, a ring on the other shell, means connecting said ring and shell for moving the ring longitudinally of the shell, a series of flexible screen-bars, and means detachably connecting the ends thereof with said rings.

3. In a machine of the class described, a revoluble shaft, two longitudinally-spaced cylindrical shells mounted thereon concentrically therewith, a pair of circumferentially-channeled rings mounted on the adjacent ends of said shells, a series of pivot-blocks disposed in the channels of the rings, screen-bars having their ends connected with said pivot-blocks and extending between the rings, clamping means for holding the screen-bars and pivot-blocks in adjusted relations to the rings, means for securing one of the rings in various circumferential relations to the shell, and means for moving the other ring longitudinally of the shell.

4. In a machine of the class described, a pair of rings having annular peripheral channels formed therein, means for supporting the rings in axially-alined and longitudinally-spaced relation to each other, series of blocks disposed in the annular channels in the rings, means for retaining the blocks in the channels, flexible screen-bars having their end-portions pivotally connected with the blocks, the bars extending across the space between the rings, and means for adjusting the relative positions of the rings so as to hold the bars thereby in various helical forms.

In testimony whereof I have hereunto subscribed my name in the presence of two witnesses.

CHARLES O. MICHAELSEN.

Witnesses:
D. O. BARNELL,
J. O. DETWEILER.